United States Patent [19]

Hasegawa et al.

[11] Patent Number: 4,916,480
[45] Date of Patent: Apr. 10, 1990

[54] IMAGE FORMING APPARATUS WITH USE OF A LASER BEAM

[75] Inventors: Hirofumi Hasegawa; Naoto Ohmori; Yukio Yamada; Narutaka Yoshida, all of Osaka, Japan

[73] Assignee: Minolta Camera Kabushiki Kaisha, Osaka, Japan

[21] Appl. No.: 373,990

[22] Filed: Jun. 29, 1989

[30] Foreign Application Priority Data

Jun. 29, 1988 [JP] Japan .................. 63-162208
Jun. 29, 1988 [JP] Japan .................. 63-162215

[51] Int. Cl.4 ........................................... G03B 27/72
[52] U.S. Cl. ........................................ 355/71; 355/244
[58] Field of Search .................. 355/40, 67, 68, 51, 355/228, 71, 229, 244, 285; 346/107, 109, 153.1, 158, 160; 358/296, 298, 300

[56] References Cited

U.S. PATENT DOCUMENTS 3,966,319 6/1976 Lang ........................................ 355/51
4,012,585 3/1977 Chen ....................................... 358/285
4,358,793 11/1982 Hosaka et al. ...................... 358/300 X

FOREIGN PATENT DOCUMENTS 54-25736 2/1979 Japan .
54-130137 10/1979 Japan .
56-23953 3/1981 Japan .
51874 3/1985 Japan .................................... 355/244
61-19033 5/1986 Japan .

Primary Examiner—L. T. Hix
Assistant Examiner—D. Rutledge
Attorney, Agent, or Firm—Price, Gess & Ubell

[57] ABSTRACT

An image forming apparatus comprising a laser beam radiating unit utilized as a light source, and an optical system that the surface of an original reflects a laser beam radiated from the radiating unit to project an image reflected from the original onto a photosensitive member. In this apparatus, an image is formed selectively in a print mode that an image results from turning on and off the laser beam, in a copy mode that a copy of an original results from exposure of the photosensitive member to the laser beam reflected from the surface of an original or in a composite mode that a composite image is formed of a copy of an original and an image resulting from turning on and off the laser beam. Further, this apparatus comprises a sensor for receiving the laser beam reflected from the surface of an original, and the image of an original and composite image are read by the sensor.

11 Claims, 6 Drawing Sheets

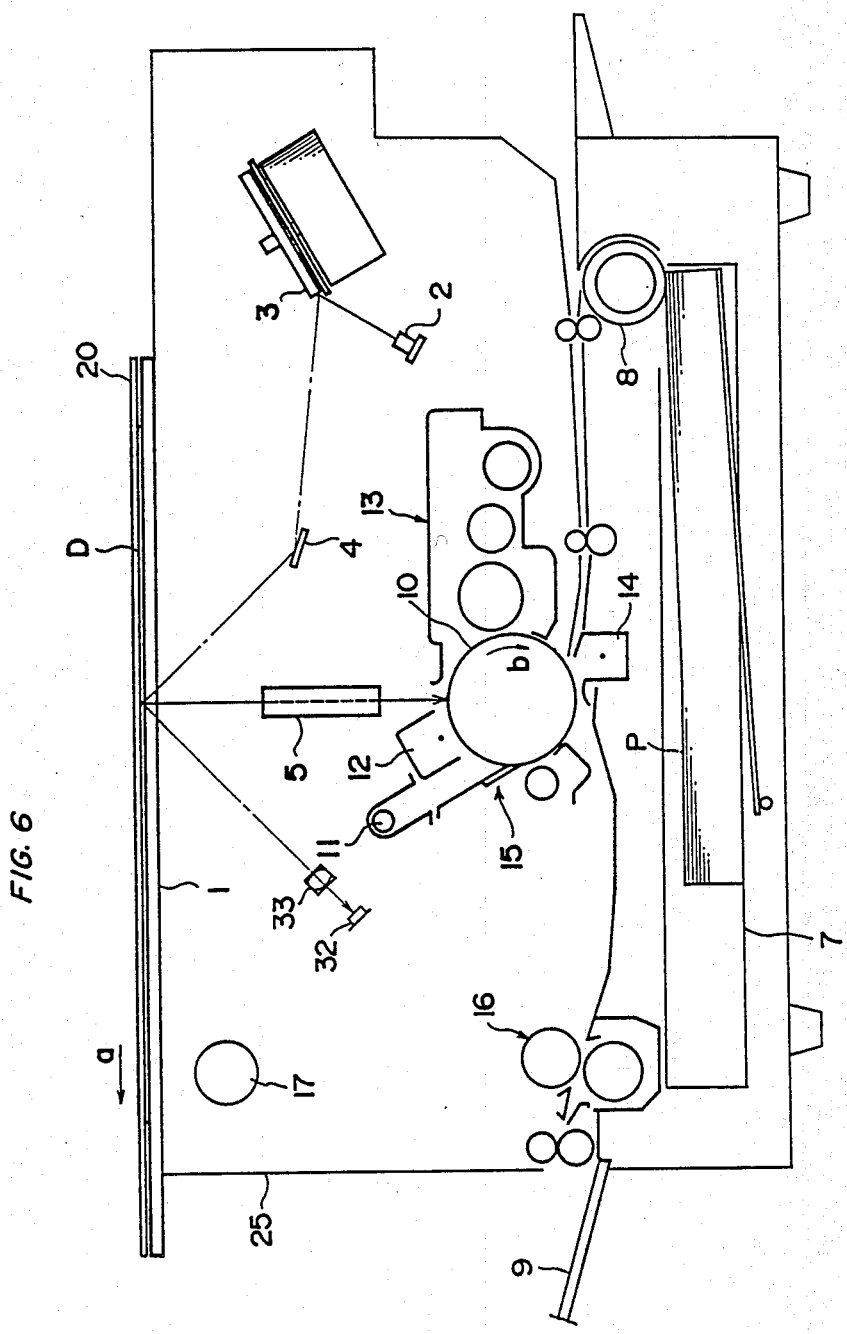

IMAGE FORMING APPARATUS WITH USE OF A LASER BEAM

BACKGROUND OF THE INVENTION

1. Field of the Invention

The present invention relates to an image forming apparatus, and more specifically, an image forming apparatus wherein a photosensitive member charged with a specified potential beforehand is exposed to a laser beam responding to image data so that an electrostatic latent image is formed on the photosensitive member, and then the latent image becomes visible on a sheet of paper.

2. Description of Related Art

Generally, regarding an image forming apparatus wherein an electrostatic latent image on a photosensitive member is caused by exposure to light with image data, and then the latent image appears on a paper sheet, an electrophotographic copier wherein a copy of an original results from reflection and a laser printer wherein a laser beam is turned on and off in accordance with image data are known. These apparatuses are different from each other only in measure of exposure, and the other elements of an image forming section except a light source can be commonly used in the apparatuses.

Therefore, Japanese Laid Open Patent Publication No. 54-25736 suggests an image forming apparatus for which exposure means utilizing the reflection of an original and exposure means utilizing a modulated laser beam are both provided, wherein the other image forming elements are commonly used. This arrangement enables an image to be formed selectively by the reflected light from an original or the modulated laser beam.

In this apparatus, however, it is impossible to form a composite image by using both the reflected light from an original and the laser beam simultaneously. For, in this apparatus, the light to be reflected by the surface of an original and the laser beam are emitted from different light sources, and their optical paths are different except for the last portion of them.

On the other hand, recently various types of image sensor for reading optical image data, which made of a photoelectric transfer device, have been developed, and they have been incorporated into image storage apparatus which also have facsimile and edit functions.

SUMMARY OF THE INVENTION

It is, therefore, an object of the present invention to provide an image forming apparatus wherein not only the reproduction of an original and the image forming with use of a modulated laser beam can be separately and simultaneously performed but also the image reading can be performed.

To attain the above-mentioned object, an image forming apparatus according to the present invention is an apparatus wherein an electrostatic latent image is formed on a photosensitive member charged with a specified potential, the photosensitive member being exposed to light from a light source, and the latent image is developed and then transferred onto a sheet of paper. The image forming apparatus comprising laser beam radiating means; optical means for projecting an image reflected from an original onto the photosensitive member; and a sensor for receiving the laser beam reflected from the surface of an original so as to output image data. The sensor is an array equipped with charge coupled devices. Also, the sensor can be a photoelectric transfer device, and in this case, an optical element for making light reflected from the surface of an original coverage on the photoelectric transfer device is necessary.

Accordingly, when the laser beam radiating means is kept on so that the surface of the original keeps on reflecting the laser beam, the image of the original is projected onto the photosensitive member, thereby reproducing the image of the original. Also, when the laser radiating means is turned on and off to radiate the laser beam in accordance with image data with the reflecting surface white, an image is formed only in response to turning on and off the laser beam. Further, when an original is set on the original glass, and at the same time the laser beam radiating means is turned on and off in accordance with image data, a composite image is formed of a copy of the original and an image resulting from turning on and off the laser beam. On the other hand, the laser beam reflected from the surface of an original is projected on to the sensor to read a light image therefrom. The image reading function enables the apparatus to function as a facsimile and an image storage device.

BRIEF DESCRIPTION OF THE DRAWINGS

These and other objects and features of the present invention will become apparent from the following description taken in conjunction with the preferred embodiments thereof with reference to the accompanying drawings.

FIG. 1 is a schematic view of the image forming apparatus showing its general constitution;

FIG. 2 is a plan view of an image sensor;

FIG. 3 is a sketch drawing of the image forming apparatus;

FIG. 4 is a block diagram showing a control circuitry;

FIG. 5 is a drawing explaining the relations among the surface of an original, an output from a laser diode and a latent image;

FIG. 6 is a schematic view showing a general constitution of an image forming apparatus as a second embodiment according to the present invention.

DESCRIPTION OF THE PREFERRED EMBODIMENTS

Preferred embodiments of an image forming apparatus according to the present invention are described below in reference to the accompanying drawings. Further, the same numerals are given to the same parts and member in all the drawings.

[FIRST EMBODIMENT: REFER TO FIGS. 1 THROUGH 5]

Figure 1:
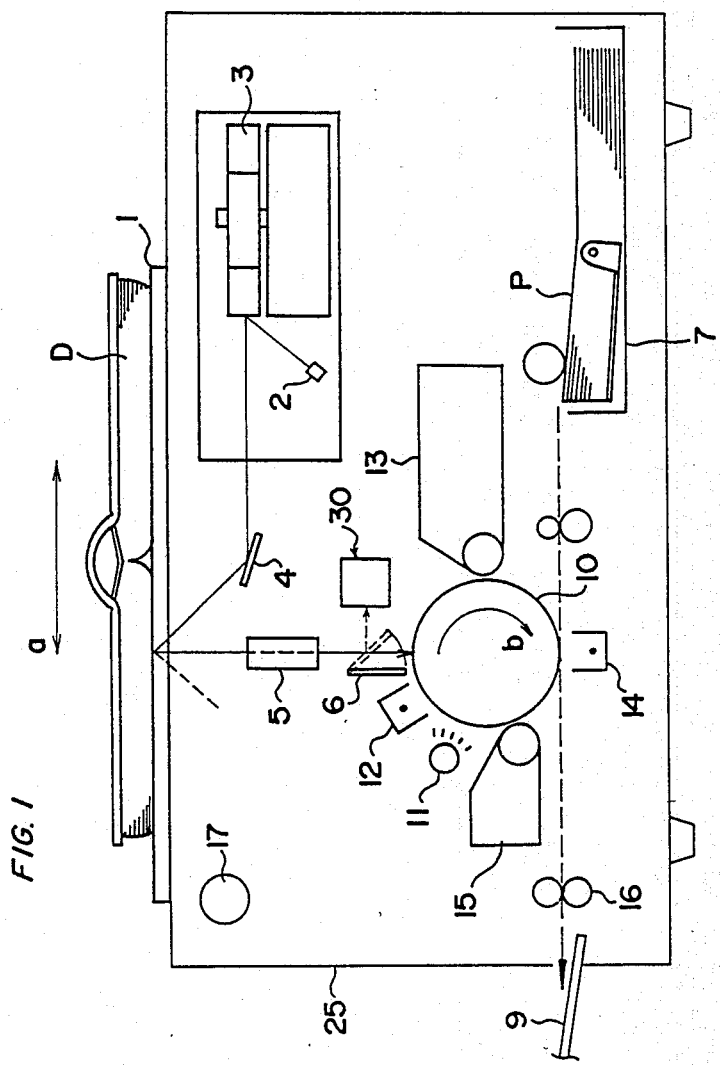
FIGS. 1 through 5 show a first embodiment of an image forming apparatus according to the present invention.

Numeral 1 in FIG. 1 is an original glass which can slide by the rotation of a motor 17 in the direction of the arrow a on a body 25 of an apparatus, and FIG. 1 shows a state wherein the original glass 1 is sliding. Numeral 2 is a laser diode. Numeral 3 is a polygon mirror enabling a laser beam to scan. Numeral 4 is a mirror. Numeral 5 is a lens array equipped with optical fiber. A laser beam emitted from the laser diode 2 irradiates each surface of the polygon mirror 3, and the reflected light irradiates the mirror 4, thereby being directed to an original D or the reserve side of an original cover 20 (refer to FIG. 3) to scan the surface. Then, the surface of a photosensitive drum 10 is exposed to the reflected light through the lens array 5. The laser diode 2 is controlled to be turned on and off by a drive circuit in accordance with an image signal produced from an image control device. The polygon mirror 3 is driven to rotate at a specified frequency. Such a control system of the image signal is so well-known that the detailed description is omitted.

Figure 2:
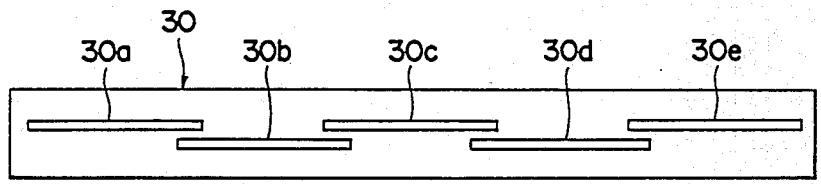

Numeral 30 is an image sensor, and it is so arranged that the focus of the laser beam reflected from the surface of an original on the image sensor 30 is equivalent to the focus of the laser beam on the photosensitive drum 10. As shown in FIG. 2, the image sensor 30, which is of an equal size projection type, has five sensor tips 30a through 30e with a number of picture elements. Numeral 6 is a mirror, and it can be set at the position shown by the solid line and dashed line in FIG. 1 by turning on and off a solenoid 47 (refer to FIG. 4). The solid 47 is usually off, and in this moment, the mirror 6 is kept at the position shown by the solid line, and accordingly the laser beam reflected from the surface of an original is projected on to the photosensitive drum 10. When the solenoid 47 is turned on, the mirror 6 is set at the position shown by the dashed line, the laser beam reflected from the surface of an original is projected onto the image sensor 30 so that the original image can be read. The image read in this way, for example, when the apparatus is also used as a facsimile, is sent to the other party through a corresponding circuit. The read image can also be input into a mechanical control unit 51 of an image data output device through an interface and stored therein. In this case, the stored image data, as described later, can be output as a modulated laser beam from a laser output device, thereby enabling an image to be formed on a paper sheet in the apparatus.

The photosensitive drum 10 can be driven to rotate in the direction of the arrow b, and around the drum 10, an eraser lamp 11 for erasing residual charge, an electric charger 12, a developing device 13 taking a magnetic brush way, a transferring charger 14, a cleaning device 15 for removing residual toner with a blade, etc. are arranged. Copying paper P is fed sheet by sheet from a feeding cassette 7 which is removable and disposed at the lower part of the body 25 of the apparatus. When a sheet fed from the cassette 7 passes between the transfer charger 14 and the photosensitive drum 10, a toner image is transferred thereon. Thereafter, the sheet is transported to the left, and the toner image is fixed thereon by heat at a fixing device 16. Then, the sheet is discharged onto a tray 9.

The process of forming an image on a sheet of copying paper in the above-described constitution is hereinafter described. In this case, the mirror 6 is kept at the position shown by the solid line in FIG. 1.

Figure 5:
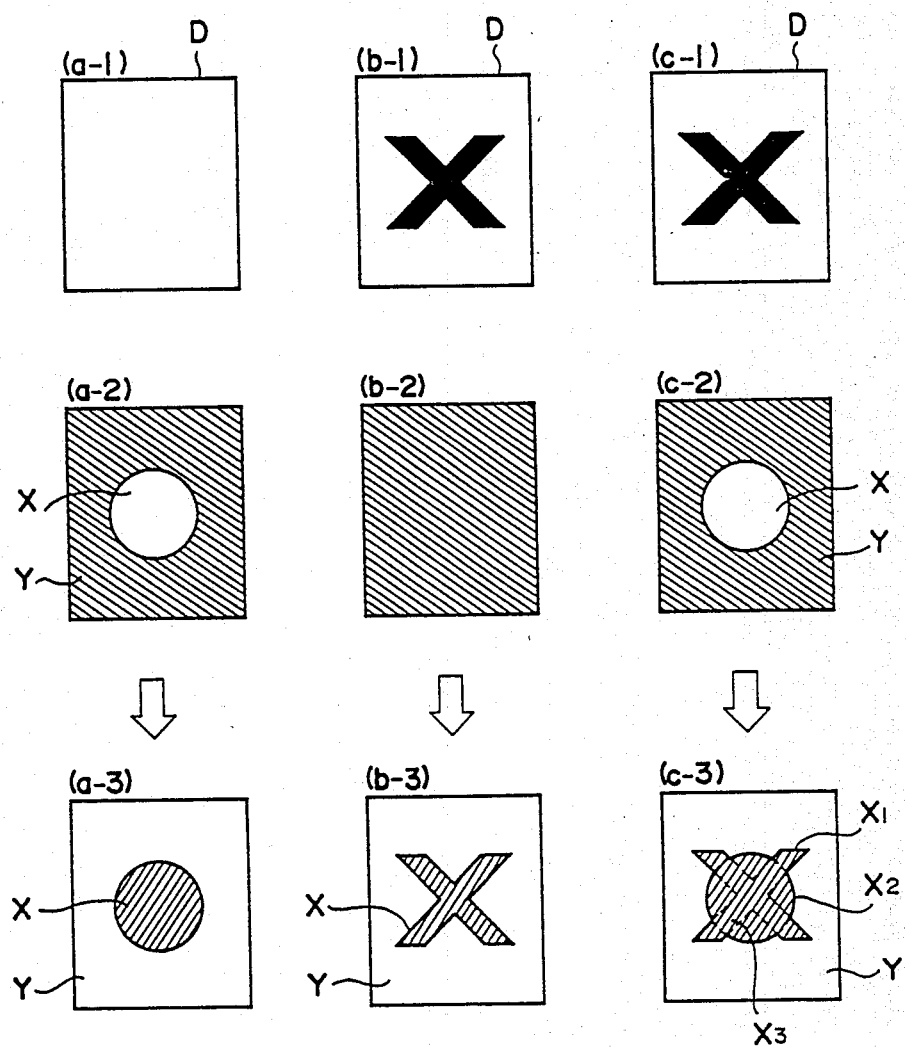

First, in a case of printing an image with the modulated laser beam, as shown by FIG. 5, (a-1), a white blank sheet D should be placed on the original glass 1 as a reflecting surface, or the reverse side of the original cover 20 should be used as a reflecting surface, and then image data is output from the laser diode 2. For example, referring to FIG. 5, (a-2), the laser diode 2 is kept off while an imaged portion X in the shape of a circle is scanned, and the laser diode 2 is kept on while a background Y shown by oblique lines in the drawing is scanned. Thereby, as shown by FIG. 5, (a-3), an electrostatic latent image is formed on the photosensitive drum 10 of the imaged portion X maintaining electric charge and the background Y where electric charge was erased.

Also, in order to print out a copy of an original, the original should be placed on the original glass 1, the laser diode 2 should be kept on all the time, and the original glass 1 should be moved at a specified speed. For example, when the laser diode 2 keeps on emitting the laser beam [FIG. 5, (b-2)] to an original D as shown by FIG. 5, (b-1), an electrostatic latent image is formed on the photosensitive drum 10 of an image portion X maintaining electric charge and a background Y where electric charge was erased, as shown by FIG. 5, (b-3).

Further, in a case of printing out a composite image of a copy of an original and an image resulting from turning on and off the laser beam, an original D should be placed on the original glass 1 to be moved at a specified speed, and at the same time the laser diode 2 should be turned on and off to output image data. For example, the laser diode 2 radiates the laser beam to an original D as shown by FIG. 5, (c-1), being off while an imaged portion X in the shape of a circle shown by FIG. 5, (c-2) is scanned and being on while a background Y as shown by oblique lines in the drawing is scanned. Thereby, a composite electrostatic latent image is formed of two images as shown by FIG. 5, (c-3). In this case, the portion shown by X1, which was exposed to the laser beam, remains charged because it corresponds to an imaged portion of the original D. The portion shown by X2, which corresponds to a background of the original D, remains charged because it was not exposed to the laser beam. The portion shown by X3 remains charged because it corresponds to an imaged portion of the original D and was not exposed to the laser beam. In the other portion Y, the charge is erased, and the portion Y becomes a background.

The diameter of the laser beam which irradiates the surface of an original needs to be narrow enough in order to reproduce the image of an original well. Unless the diameter of the laser beam is narrow, the laser beam will be apt to irradiate both white and black portions of an original at a time, and the scattering coefficient of the reflection on the surface of the original will be large, resulting in poor image reproduction.

Figure 3:
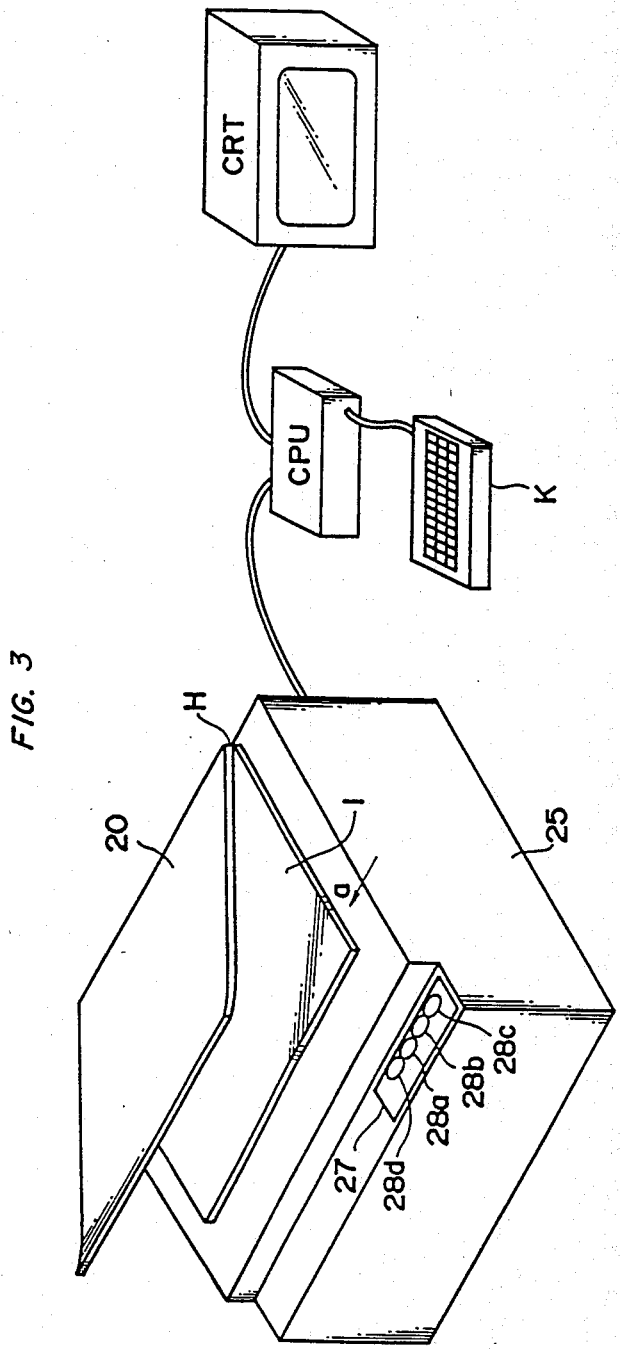

The apparatus as a whole is constituted as shown in FIG. 3. The main body 25 of the image forming apparatus is connected to a host computer CPU which is operated with a keyboard K, and the host computer CPU is connected to a display device CRT.

Figure 4:
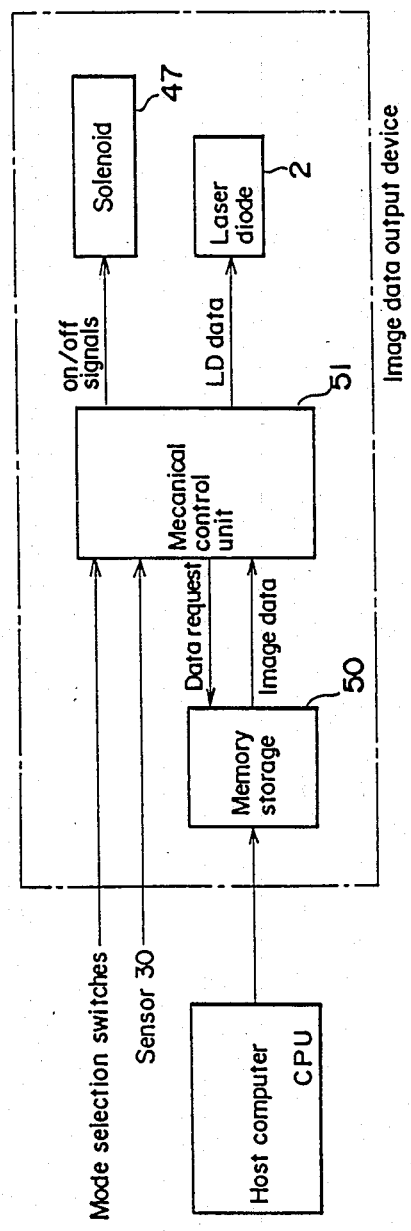

The host computer CPU is connected to a memory storage 50 of the image data output device (refer to FIG. 4). The memory storage 50 outputs image data in response to a data requiring signal from a mechanical control unit 51, and the laser diode 2 is controlled in accordance with the image data. The mechanical control unit 51 also turns on and off the solenoid 47 which moves the mirror 6.

A copy mode selection switch 28a, a print mode selection switch 28b, a composite mode selection switch 28c and a reading mode selection switch 28d are provided on a control panel of the body 25, and each mode is selected when a corresponding switch is turned on. Signals produced from these switches 28a, 28b, 28c and 28d are input into the mechanical control unit 51 so that the mechanism control unit 51 can perform necessary control. Further, the image read by the image sensor 30 is input into the mechanical control unit 51.

In this embodiment, the laser beam can irradiate the surface of an original directly without being reflected on the mirror 4. However, when the lens array 5 is installed as shown in FIG. 1, the laser beam should irradiate the surface of an original at a small angle of incidence so that the lens array 5 can receive the reflected light more effectively. Accordingly, it is preferable that the mirror 4 is arranged as shown in FIG. 1 to make the angle of incidence smaller and at the same time, the arrangement contributes to the compactness of the optical system. Additionally, as far as the effectiveness is concerned, it is preferred that the lens array 5 is arranged on the light path shown by the dashed line in the drawing.

On the other hand, as a photosensitive member, not only one on which an electrostatic latent image is formed but also a silver salt film can be used. Furthermore, as a means of scanning the image of an original, a moving original glass type has been adopted in this embodiment, but the optical system can be so made to be movable instead.

[SECOND EMBODIMENT: REFER TO FIGS. 6 AND 7]

As shown in FIG. 6, an image forming apparatus of a second embodiment has the same constitution as that of the first embodiment, wherein an image is formed with a laser beam. However, an image sensor 32 into which one picture element type of a photoelectric transfer device is incorporated is used as an image reading means instead of the image sensor 30.

In this second embodiment, the image forming apparatus comprises basically the same devices and members as shown in FIG. 1, that is, the original glass 1, the laser diode 2, the polygon mirror 3, the mirror 4, the photosensitive drum 10, the electric charger 12, the developing device 13, etc.

Copying paper P makes a U-turn around a feeding roller 8 and is fed to the transfer section.

Figure 7:
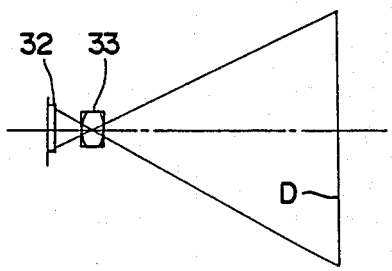
FIG. 7 is an explanatory view of a light path from the surface of an original to an image sensor.

The image sensor 32 is so arranged that the focus of the laser beam reflected from the surface of an original on the sensor 32 is equivalent to the focus of the laser beam on the photosensitive drum 10, and immediately before the sensor 32, a lens 33 for projecting the laser beam onto the sensor 32 is arranged. The lens 33 receives light reflected from the surface of an original, reduces the image, and projects the reduced image onto the sensor 32. As shown in FIG. 7, as far as the length along the direction of the main scanning (the direction in which the polygon mirror 3 spreads the laser beams on original) is concerned, a photosensitive portion of the image sensor 32 is longer than the reduced image of an original D of the maximum size which can be scanned in this apparatus. That is, the length of the photosensitive portion of the image sensor 32 along the direction of the main scanning, when an image is projected by a lens like this embodiment, should be larger than the value calculated from the length of an original along the direction of the main scanning multiplied by the reduction ratio of an image by the lens 33. The timing of reading an image by the image sensor 32 is synchronized with the timing of modulating the laser beam by a clock.

The image read in this way, for example, when the apparatus also functions as a facsimile, is sent to the other party through the corresponding circuit. Also, the read image, as shown in FIG. 4, can be input into the mechanical control unit 51 of the image data output device through the interface and stored therein. In this case, the stored image is output from the laser diode 2 as a modulated laser beam, and further it can be combined with a copy of an original to make a composite image on a paper sheet.

The process of forming an image on a paper sheet in the above-described constitution is hereinafter described.

Basically, the image forming process in this second embodiment is similar to the image forming process which was described in conjunction with the first embodiment referring to FIG. 5, so that the detailed description is omitted.

In this second embodiment, the lens 33 is used as an optical element for projecting the laser beam reflected from the surface of an original on to one picture element type of photoelectric transfer device, but it is possible that optical an fiber is arranged at an incidence section of light reflected from the surface of an original so that the reflected light can converge on the photoelectric transfer device.

As a photosensitive member, one on which an electrostatic latent image is formed can be used but also a silver salt film can be used.

Further, if the photoelectric transfer device reads an image synchronized with a clock signal for modulating the laser beam, the resolution in the image reading will be equivalent to the resolution in the printing with the laser beam.

When the timing of reading an image is different from that of modulating the laser beam, for example, if an image is read at a half of the clock frequency at which the laser beam is modulated, the resolution will become half. Thus, the resolution can be altered easily.

Although the present invention has been described in connection with the preferred embodiment thereof, it is to be noted that various changes and modifications are apparent to those who are skilled in the art. Such changes and modifications are to be understood as included within the scope of the present invention as defined by the appended claims, unless they depart therefrom.

What is claimed is:

1. An image forming apparatus, comprising:
   an original glass for supporting an original;
   a rotatable photosensitive member;
   laser beam radiating means for radiating a laser beam to said original glass, said laser beam radiating means including a radiant element and a scanning device;
   control means for turning on and off said radiant element to radiate a laser beam in accordance with image data;
   optical means for projecting an image reflected from an original onto said photosensitive member;
   a sensor for receiving the laser beam reflected from the surface of an original so as to output image data; and
   scanning means for relatively scanning the reflected image from the surface of an original in the direction perpendicular to the direction in which said scanning device spreads the laser beams on the original.

2. An image forming apparatus as claimed in claim 1, wherein said sensor is an array equipped with charge coupled devices with are aligned in the direction in which said scanning device spreads the laser beams on the original.

3. An image forming apparatus as claimed in claim 1, wherein said sensor is a photoelectric transfer device near which an optical element for making light reflected from the surface of an original converge on said photoelectric transfer device is arranged.

4. An image forming apparatus as claimed in claim 1, wherein said optical means includes a changing member for changing a path of light reflected from the surface of an original to a first optical path leading the light to said photosensitive member and a second optical path leading to said sensor.

5. An image forming apparatus as claimed in claim 4, wherein said sensor is an array equipped with charge coupled devices, and the length of said first optical path is the same as the length of said second optical path.

6. An image forming apparatus as claimed in claim 1, wherein said optical means comprises a lens array which is equipped with optical fiber and located between the surface of an original and said photosensitive member, and a mirror for guiding the laser beam radiated from said laser beam radiating means to the surface of an original.

7. An image forming apparatus, comprising:
an original glass for supporting an original;
a rotatable photosensitive member;
laser beam radiating means including a radiant element for radiating a laser beam and a scanning device for scanning the laser beam to an original on said original glass in an first direction;
control means for turning on and off said radiant element to radiate the laser beam in accordance with image data;
optical means for projecting an image reflected from an original onto said photosensitive member so as to reproduce a composite image on the photosensitive member;
scanning means for relatively scanning the reflected image in a second direction perpendicular to the first direction; and
reading means for reading the reflected image and outputting composite image data in accordance with said reflected image.

8. An image forming apparatus as claimed in claim 7, wherein said reading means includes a photoelectric transfer element fixedly provided in said image forming apparatus and second optical means for making light reflected from the surface of an original converge on said photoelectrical transfer element.

9. An image forming apparatus, comprising:
an original glass for supporting an original;
a rotatable photosensitive member;
laser beam radiating means including a radiant element for radiating a laser beam and a scanning device for scanning the laser beam to an original on said original glass in a first direction;
control means for turning on and off said radiant element to radiate the laser beam in accordance with image data;
optical means for projecting an image reflected from an original onto said photosensitive member so as to reproduce a composite image on the photosensitive member;
scanning means for relatively scanning the reflected image in a second direction perpendicular to the first direction;
reading means for reading the reflected image and outputting image data in accordance with said reflected image; and
guiding means for selectively guiding the reflected image to either said photosensitive member or said reading means.

10. An image forming apparatus as claimed in claim 9, further comprising:
mode selection means for selecting a print mode in which a composite image is reproduced on the photosensitive member or reading mode in which composite image data in accordance with said reflected image is outputted; and
driving means for driving said guiding means based on said mode selection means.

11. An image forming apparatus having a copying and printing capability, comprising:
means for generating a laser beam;
means, responsive to the impact of a laser beam, for recording an image realized by the laser beam, including a recording member having a surface responsive to the laser beam;
means for scanning the laser beam across the surface of the recording means;
means for supporting an original for a copying mode of operation;
means for scanning the original with the laser beam to provide a copy image for the recording means;
means for receiving input data to control the laser beam to provide a printing image for the recording means;
means for providing paper for both a printing and copying mode of operation to receive and fix any indicia image information on the recording member;
generating means for receiving the laser beam with indicia information and providing corresponding electrical signals, and
control means, responsive to an operator, for selecting one of a copy mode, a print mode, and an electrical signal generating mode for directing a specific mode of operation of the laser beam.

* * * * *